Jan. 20, 1970  J. E. PASCENTE  3,491,284
ZERO VOLTAGE A.C. SWITCHING CIRCUITS
Filed May 24, 1967  2 Sheets-Sheet 1
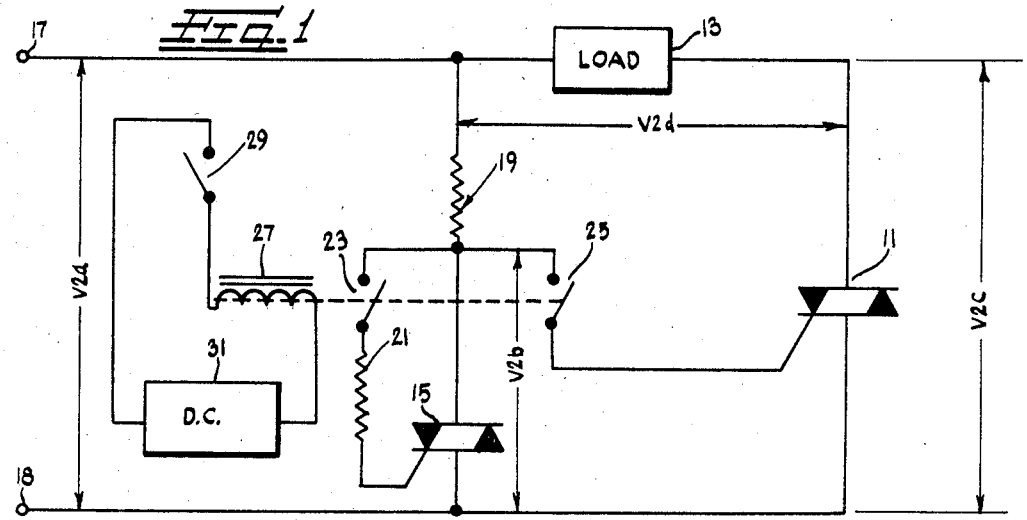
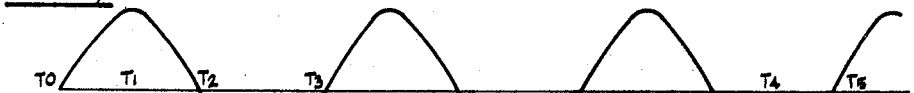
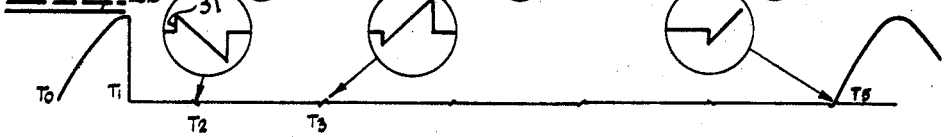
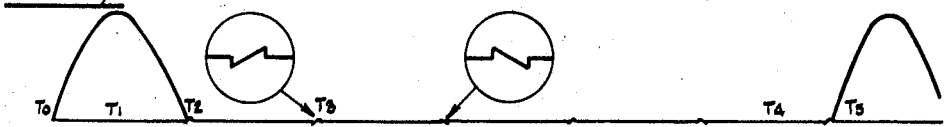
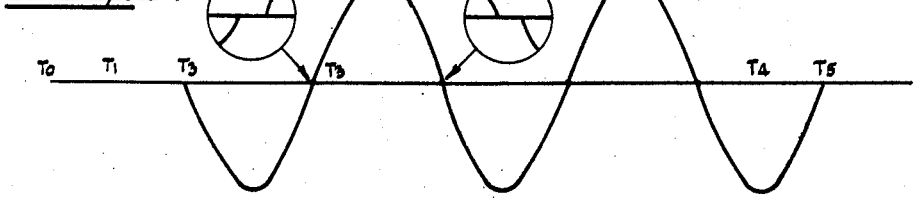
Inventor
JOSEPH E. PASCENTE Jan. 20, 1970 J. E. PASCENTE 3,491,284
ZERO VOLTAGE A.C. SWITCHING CIRCUITS
Filed May 24, 1967 2 Sheets-Sheet 2
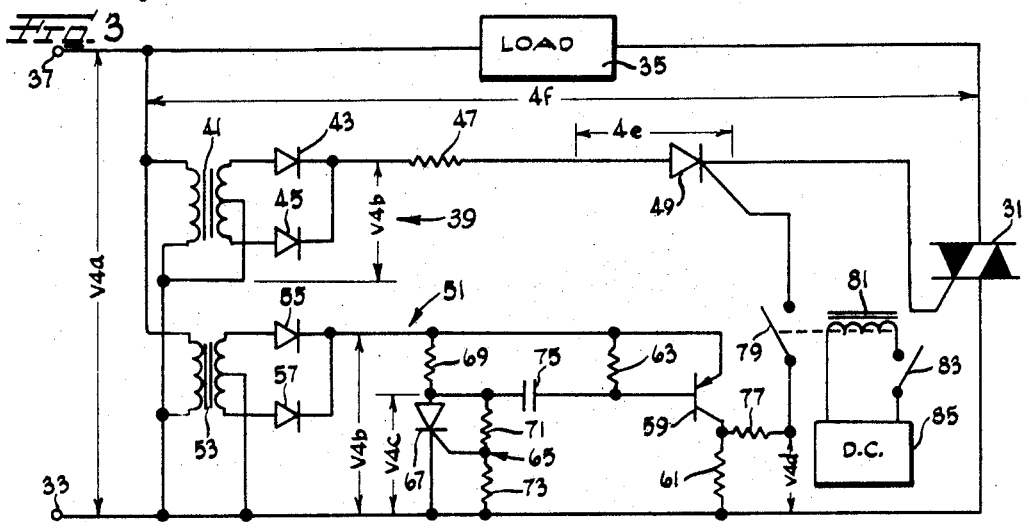
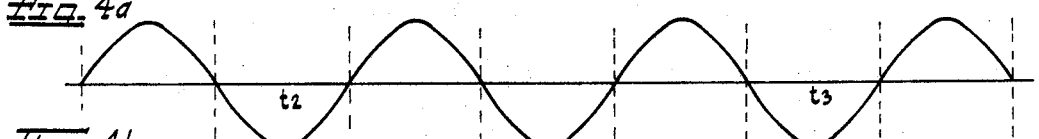
Inventor
JOSEPH E. PASCENTE United States Patent Office 3,491,284
Patented Jan. 20, 1970

3,491,284
ZERO VOLTAGE A.C. SWITCHING CIRCUITS
Joseph E. Pascente, Norridge, Ill., assignor to Grigsby-Barton, Inc., Arlington Heights, Ill., a corporation of Illinois
Filed May 24, 1967, Ser. No. 641,023
Int. Cl. G05f 1/40, 1/44
U.S. Cl. 323—22                                     16 Claims

ABSTRACT OF THE DISCLOSURE

A control circuit for controlling the application of an alternating current source to a load at points corresponding to zero voltage. The circuit includes a pair of control devices, such as triac or SCR thyristor devices, each having a pair of load terminals and a control terminal. The devices are such that upon the reduction of current flow therethrough to zero they become starved-off. The load terminals of one of the control devices is connected in series with the load and power source. The control terminal of this control device is operated by the other control device so that it is caused to conduct at the zero voltage level of the alternating current power source.

This invention generally relates to a switching circuit for controlling the flow of alternating current and, more particularly, relates to a switching circuit for controlling the flow of alternating current wherein the turn-on switching function is accomplished at points corresponding to zero voltage and zero current and the turn-off is at zero current.

The abrupt switching of alternating current flowing through a load, particularly if the load is reactive, often results in significant arcing at the switch contacts. Such arcs, having a generally impulse wave shape, necessarily generate electromagnetic energy covering a very wide portion of the radio frequency spectrum. Often such radiation produces considerable interference to equipment operating in the vicinity of the switch.

Conventional switches are randomly operated, interrupting and closing the circuit without consideration being given as to the instantaneous value of the source current being switched. Not only does such random switching of the load produce undesirable radio frequency interference, but may also create extreme transient voltages across reactive loads. These transients are particularly undesirable when the load includes logic circuitry, since such transient voltages may be carried into the rectified voltage thus changing the state of the logic within the circuit to which it is supplying current.

A main object of the present invention is to provide an improved control circuit for controlling the flow of alternating current. A further object is to provide an improved control circuit for switching the flow of alternating current wherein the switching function is accomplished at points corresponding generally to zero voltage or zero load current. A still further object is to provide an improved alternating current switch for minimizing radio frequency interference and for reducing associated circuit switching transients.

Other objects and advantages of the present invention will become apparent through reference to the following description and accompanying drawings, in which:

FIGURE 1 is a schematic diagram of a switch including certain features of the invention;

FIGURES 2a, 2b, 2c and 2d are graphical illustrations of voltage wave forms across various points of the circuit illustrated in FIGURE 1 and further include enlarged illustrations of various portions of the wave forms illustrated;

FIGURE 3 is a schematic diagram of an alternate embodiment of a switch including certain features of the invention; and, FIGURES 4a, 4b, 4c, 4d, 4e and 4f are graphical illustrations of voltage wave forms across various points of the circuit illustrated in FIGURE 3.

Briefly, the control circuits illustrated in FIGURES 1 and 3 include a first control device coupled in series with a load and an alternating current power source. The first control device is controlled by a second control device so that it conducts close to the zero voltage level of the alternating current power source which occurs immediately following an energizing signal.

More particularly, the control circuit illustrated in FIGURE 1 includes the first control device, which has two load terminals and a control or gate terminal and is rendered conductive between its load terminals by a control signal applied to its gate terminal. The control device is rendered nonconductive by the current flowing through the load terminals being reduced to approximately zero. The first control device is preferably a semiconductor thyristor element which controls the flow of current in both directions. One such element is a triac, one type of which is described in the General Electric publication 200.35–3/66 entitled "Using the Triac for Control of A.C. Power."

The triac, hereinafter referred to as the switching triac 11, switches the current flow through a load 13. The load terminals of the switching triac 11 and the load 13 are in series connection across a source of alternating current (not shown) connected to terminals 17 and 18.

The turn-on of the switching triac 11 is controlled by the second control device which is similar to the first control device in characteristics and likewise is preferably a triac 15 (hereinafter referred to as the control triac). The load terminals of the control triac 15 are connected in series with a switching triac gate impedance, which in the illustrated embodiment is an inverted voltage dependent resistor 19 (i.e., its resistance increases as the voltage applied thereto increases). Such a resistor is used in order to provide a low resistance at turn-on of the switching triac, but a much higher RMS resistance thereby reducing power consumption, size, cost and heat generation. The remaining lead of the resistor is connected to terminal 17 and the remaining load terminal of the triac 15 is connected to a source of varying voltage potential, which in the illustrated embodiment is the source voltage, by means of terminal 18.

The gate terminal of the control triac 15 is connected through a series connected control triac gate resistor 21 and a first normally open switch means 23, which closes in response to an energizing signal, to the common junction between the control triac 15 and the switching triac gate resistor 19. The gate terminal of the switching triac 11 is connected through a second normally open switch means 25 to the junction between the triac 15 and the gate resistor 19, and upon closure of the switch means, receives spaced triggering voltages. The second switch means 25 closes in response to the energizing signal but, for reasons hereinafter considered, after the closure of the first switch means 23. In the illustrated embodiment, the switch means 23 and 25 are reed relay contacts which are actuated by a common coil 27 connected in series with an on/off switch 29. The coil 27, switch 29 combination is connected across a direct current power source 31.

To assist in understanding the operation of the illustrated embodiment, FIGURES 2a through 2d are provided. The voltage wave shapes illustrated in FIGURE 2a is that of a 60 hertz, 120 volt commercial power source and corresponds to the voltage V2a designated in FIGURE 1. FIGURES 2b and 2c correspond to the voltages V2b and V2c of FIGURE 1 taken across the control and switching triacs 15 and 11 respectively during the switching operation. FIGURE 2d is the wave shape of the voltage V2d impressed across the load 13 during the switching operation.

For purposes of discussion, it will be assumed that the on/off switch 29 is closed at time $T_1$ thereby energizing the relay coil 27. Each of the reed relay contacts 23 and 25 are provided with a different pull-in time delay so that, as previously mentioned, contact 23 is closed prior to the closure of the contact 25. Closure of contact 23 applies voltage to the gate of the control triac 15 through resistors 19 and 21 causing the control triac 15 to conduct. This causes a sharp reduction in voltage across the triac at time $T_1$ as illustrated in FIGURE 2b. Subsequently, the relay contact 25 closes, connecting the gate terminal of the switching triac 11 to the potential V2b across the control triac 15. However, at this instant the control triac 15 is conducting and correspondingly the voltage drop thereacross is negligible. Hence, there is insufficient voltage to render the switching triac 11 conductive. As the supply voltage approaches zero, corresponding to time $T_2$, the current through the control triac 15 drops below the minimum value necessary for conduction, causing the triac to open and the voltage thereacross to rise slightly as at 31 in the enlargement of FIGURE 2b. As the supply voltage crosses the zero axis continuing upon its negative half cycle, voltage V2b will be applied to the gate of the switching triac 11 through the switching triac gate resistor 19 causing the switching triac 11 to conduct a short time after time $T_2$. The control triac 15 conducts subsequent to the switching triac 11 because the switching triac gate resistor 19 reduces the voltage applied to its gate terminal. Alternatively, the control triac can be selected to be less sensitive than the switching triac.

As a result of the nature of the device, the switching triac 11 will remain in its conductive state so long as the minimum holding current is flowing therethrough. Upon conduction of the switching triac 11, voltage V2d is impressed across the load as shown in FIGURE 2d. Thus, it is apparent that regardless of when the on/off switch 29 is closed, voltage will not be impressed across the load 13 until the source voltage crosses its zero axis thereby insuring turn-on at a point corresponding generally to zero load current and zero source voltage.

As the source voltage again returns to the zero axis corresponding to time $T_3$, the holding current through each of the triacs 11 and 15 will, for a short period of time, fall below minimum value causing the triacs to open. As the source voltage V2a proceeds upon its positive half cycle, the switching triac 11 and subsequently the control triac 15 will again fire. Thus, for a very short period of time, as the source voltage crosses the zero axis, the voltage across the load will be zero as illustrated in the enlargement of FIGURE 2d. Since the period of time during which the voltage across the load is zero is extremely small, and for slightly reactive loads would be immeasurable, the power delivered to the load 13 is not materially effected. A similar situation occurs each time the source voltage crosses the zero axis.

With respect to opening of the control circuit, it will be assumed, for purposes of discussion, that the on/off switch 29 is opened at time $T_4$, thereby de-energizing the relay coil 27 causing both the reed relays 21 and 25 to open. Upon opening, both of the triacs will remain conductive until the current therethrough falls below minimum holding value. This situation occurs at approximately $T_5$ when the source voltage crosses the axis immediately subsequent to opening of the switch 29. At time $T_5$ the current through the switching triac 11 falls below minimum value interrupting power to the load 13. Thus, it can be seen that regardless of the point at which the on/off switch 29 is opened or closed, the voltage impressed across the load 13 will be turned off only at points corresponding generally to zero load current. Thus, a switch has been provided for controlling the current flow through a load which will insure turn-on generally at zero source voltage and turn-off at generally zero load current.

Referring to FIGURE 3, the alternate embodiment includes a first control device in the form of a switching triac 31 having two load terminals and a control or gate terminal. One load terminal is connected to a terminal 33 which is in turn connected to an alternating current power source (not shown), and the remaining load terminal is connected to one terminal of a load 35. The remaining load terminal is connected to a terminal 37 for connection to the remaining output terminal of the alternating-current power source. As described hereinafter, a signal is applied to the gate of the switching triac 31 so that it is rendered conductive to couple the power supply to the load 35 at points corresponding to zero source voltage and current, and it is rendered non-conductive to disconnect the load at points corresponding to zero current.

Switching voltage in the form of pulsating direct-current is supplied to the gate terminal of triac 31 by a full-wave triac gate power supply 39 which includes a transformer 41. The primary winding of the transformer is connected to terminals 33 and 37. The secondary terminals of the transformer 41 are each connected to an anode of a pair of diodes 43 and 45, and the center tap of the transformer 41 is connected to the terminal 33 which is connected to one load terminal of the switching triac 31. The cathodes of the diodes 43 and 45 are commonly connected to one terminal of a current-limiting resistor 47, the remaining terminal of which is connected to the anode of a second control means 49 in the form of a silicon controlled rectifier (hereinafter referred to as the control rectifier). The control rectifier 49 functions as a switching element for controlling the passage of the pulsating direct current voltage from the supply 39 to the triac 31 gate terminal, and the cathode thereof is conneced to the gate terminal of the triac 31. The transformer 41 is selected to provide a leading phase shift of the output voltage wave when compared to the primary voltage wave, which shift is sufficient to provide an output voltage to operate the control rectifier 49 at zero voltage of the source.

As shown in FIGURE 3, the gate terminal of the control rectifier 49 is supplied with a switching voltage in the form of pulsating direct current by a rectifier gate power supply 51 which includes a transformer 53, the primary terminals of which are connected to the power terminals 33 and 37. The transformer 53 is similar to the transformer 41 and is also selected to provide a leading phase shift of the output wave when compared to the primary voltage wave. The secondary terminals of the transformer 53 are respectively connected to the anodes of a pair of diodes 55 and 57 and the transformer secondary center tap is secured to terminal 33. The cathodes of the rectifiers 55 and 57 are commonly connected.

The switching voltage applied to the gate of the control rectifier 49 is controlled by a PNP transistor 59, the emitter of which is connected to the cathode of the diodes 55 and 57 and the collector of which is connected through a load resistor 61 to terminal 33. The PNP transistor 59 is normally biased at cut-off by means of a biasing resistor 63 connected between the emitter and the base thereof. The transistor 59 is pulsed into its conducting or saturated state by a pulse generating means 65 which comprises a silicon controlled rectifier 67, the cathode of which is connected to the terminal 33 and the anode of which is connected through a current-limiting resistor 69 to the common cathode connection of the diodes 55 and 57. Gate voltage is supplied to the silicon controlled rectifier 67 by means of a resistive divider network comprising a pair of series connected resistors 71 and 73. The resistors 71 and 73 are secured between the anode and the cathode of the rectifier 67. The common junction of the divider resistors 71 and 73 is connected to the gate of the silicon controlled rectifier 67. The resistors 71 and 73 and the leading phase shift of the transformer 53 are so selected that the rectifier 67 is fired at that moment when the source voltage connected to the terminals 33 and 37 crosses its zero axis.

A coupling capacitor 75 is connected between the anode of the silicon controlled rectifier 67 and the base of the transistor 59 so that upon firing of the silicon controlled rectifier 67, a narrow pulse is passed through the coupling capacitor 75 thereby abruptly firing the transistor 59. The momentary conduction of the transistor 59 in response to the pulse produces a short positive going pulse across the load resistor 61. This pulse is coupled through a coupling resistor 77 to the movable member of a set of contacts 79 of a reed relay 81. The fixed contact of the relay 81 is connected to the gate of the control rectifier 49 so that upon closure of the contacts a spaced intermittent signal is applied to the gate of the control rectifier 49. The coil of the reed relay 81 is connected through a single-pole, single-throw on/off switch 83 to the terminals of a direct-current power supply 85.

To assist the reader in understanding the operation of the embodiment of FIGURE 3, FIGURES 4a through 4f are provided. In FIGURE 4a the sine wave output of a commercial 115 volt, 60 hertz power source designated V4a is illustrated. As previously mentioned, the transformers 41 and 53 are selected to provide a leading phase shift of the secondary voltage wave with respect to the primary voltage. The rectified secondary voltages of the power supplies 39 and 51 are illustrated in FIGURE 4b. The wave illustrated in FIGURE 4c is taken between the anode and cathode of the silicon controlled rectifier 67. As previously mentioned, the values of the resistors 71 and 73 are selected to cause the control rectifier 71 to fire when the wave of the pulsating direct current voltage (FIGURE 4b) reaches a value at time $T_1$, which corresponds to the zero cross-over point of the supply voltage (FIGURE 4a). Once the control rectifier 67 is fired, it will continue to conduct until the pulsating wave 4b returns to zero whereupon the control rectifier 67 is "starved off."

Upon firing of the silicon controlled rectifier 67, i.e., at time $T_1$, the voltage drop across the rectifier is abruptly reduced, thereby producing a negative pulse at time $T_1$ which is coupled through the coupling capacitor 75 to the base of the transistor 59 causing it to momentarily conduct. This abrupt conduction of the transistor 59 produces a positive voltage spike (FIGURE 4d) across the load resistor 61 at time $T_1$. It should be noted that this pulse is provided at precisely that moment when the source voltage crosses the zero axis. If the reed relay 81 is not closed, the pulse is not supplied to the gate of the control rectifier 49, hence the control rectifier remains in a nonconductive state.

For purposes of further discussion, it will be assumed that the reed relay 81 is energized at time $T_2$ thereby closing the normally open contact 79, thus connecting the gate of the rectifier 49 to the collector of the transistor 59 through the resistor 77. The next positive pulse (FIGURE 4d) across the load resistor 61, after closure of the contact 79, passes to the gate of the controlled rectifier 49 thereby firing it and allowing voltage to pass therethrough to the gate terminal of the triac 31. Conduction of the triac 31 causes the entire source voltage to be impressed across the load 35. It should be noted that the source voltage is initially impressed across the load at that moment when the source voltage and current are zero. The triac 31, once fired, remains conductive until "starved off" by the passage of the source current through its zero axis. At approximately the moment of "starve off," i.e. at time $T_1$, a positive pulse is again produced across the load resistor 61 and applied to the gate of the control rectifier 49 to thereby again render the control rectifier 49 conductive. The voltage impressed across the load 35 is illustrated in FIGURE 4f. From the above, it can be seen that the reed relay 81 may be randomly energized and after closure of the contact 79 power will be initially applied to the load at the moment commencing with the next crossing of the source voltage over its zero axis.

For purposes of subsequent discussion, it will be assumed that the reed relay 81 is de-energized at a time $T_3$. De-energization of the reed relay 81 disconnects the gate of the control rectifier 49 from the collector of the transistor 59 thereby preventing further firing of the control rectifier 49 and correspondingly preventing the output of the supply 39 from passing to the gate of the triac 31. As the current through the load reaches zero, the triac 31 is "starved off." Since subsequent firing pulses are prevented from passing through the contact 79, the triac 31 remains in its non-conductive state until the reed relay 81 is again energized. Thus, a switch has been provided for controlling the current flow through a load which will provide turn-on at zero source current and voltage and turn-off at zero load current.

A common power supply may be substituted for the power supplies 39 and 51 if the volt-amp output rating of the transformer was high enough so that when the control rectifier 49 conducts, the change in current $(di/dt)$ would not affect the waveform of the voltage V4b applied to the silicon controlled rectifier 67. Otherwise; false outputs (not at zero crossings) would occur at V4d. Moreover, the power supply 39 and the control rectifier 49 may be eliminated and the output of contact 79 may be directly coupled to the gate of the triac 31. However, if an inductive load is being switched, a resistor should be coupled in parallel with the load to insure that once the triac 31 is turned on, sufficient current flows therethrough to keep it on.

Various other changes and modifications may be made without departing from the spirit and scope of the invention as described by the appended claims.

What is claimed is:

1. A control circuit for controlling the current flow through a load from an alternating current power source having two terminals, said circuit comprising first and second control devices each having two load terminals and a control terminal, each of said first and second control devices being rendered conductive between its load terminals by a control signal applied to the control terminal and being rendered non-conductive by current flowing through the load terminals being reduced to approximately zero, one load terminal of said first control device being connectable to one terminal of said alternating current power source, the other load terminal of said first control device being connectable through the load to the other terminal of said power source to form a series combination of said first control device and the load, means for supplying a voltage having cyclic variations derived from said power source to the control terminal of said second control device to provide a triggering signal across the load terminals thereof at the beginning of a half-cycle of said power source voltage, first circuit means for coupling the load terminals of said second control device across said power source terminals in parallel with the series combination of said first control device and the load, and second circuit means for coupling said triggering signal to the control terminal of said first control device, thereby rendering said first control device conductive so as to impress the source voltage across the load at a point in time corresponding approximately to zero volts.

2. The control circuit of claim 1 wherein said first control device comprises a triac which includes two load terminals and one control terminal.

3. The control circuit of claim 1 wherein said first circuit means includes a resistor interconnected between one of said source terminals and one of the load terminals of said second control device, and said means for supplying a voltage having cyclic variations includes a further resistor coupled between said one load terminal and the control terminal of said second control device, so that said triggering signal is produced by the voltage across the load terminals of said second control device when it becomes non-conductive at approximately the zero-voltage crossings of the source voltage.

4. The control circuit of claim 1 wherein said means for supplying a voltage having cyclic variations includes a transformer for providing a signal voltage which is in leading phase relation to the voltage of said alternating power source, a rectifier coupled to the output of said transformer for providing a pulsating D.C. voltage of leading phase, means for supplying said D.C. voltage across the load terminals of said second control device, and voltage dividing means for supplying a fraction of said D.C. voltage to the control terminal of said second control device, said fractional voltage and said phase relation being of such amounts to cause said second control device to become conductive when said source voltage crosses zero.

5. The control circuit of claim 1 wherein said second circuit means comprises a third control device having two load terminals and a control terminal and having a characteristic such that it is rendered conductive between its load terminals by a control signal applied to the control terminal and rendered non-conductive by reduction of current flow to approximately zero through its load terminals, means for selectively coupling said triggering signal to the control terminal of said third control device, means for supplying to one load terminal of said third control device a voltage having cyclic variations derived from said power source and a leading phase relation thereto, and means for coupling the other load terminal of said third control device to the control terminal of the first control device.

6. The control circuit of claim 5 wherein said third control device is a silicon controlled rectifier and said means for supplying a voltage having cyclic variations derived from said power source comprises a transformer having a primary winding coupled across said source terminals and a secondary winding providing said leading voltage phase relation coupled to a rectifier for supplying a pulsating D.C. voltage across the anode and cathode of said silicon controlled rectifier.

7. The control circuit of claim 5 wherein said means for supplying a voltage having cyclic variations includes a transformer for providing a signal voltage which is in leading phase relation to the voltage of said alternating power source, a rectifier coupled to the output of said transformer for providing a pulsating D.C. voltage of leading phase, means for supplying said D.C. voltage across the load terminals of said second control device, and voltage dividing means for supplying a fraction of said D.C. voltage to the control terminal of said second control device, said fractional voltage and said phase relation being of such amounts to cause said second control device to become conductive when said source voltage crosses zero and a transistor circuit responsive to the voltage across the load terminals of said second control device for generating the triggering signal in the form of a short duration pulse when said second control device becomes conductive.

8. A control circuit for controlling the current flow through a load from an alternating current source having two terminals, said circuit comprising first and second control devices, each having two load terminals and a control terminal and having a characteristic so as to be rendered conductive between their load terminals by a control signal applied to the control terminal and rendered non-conductive by reduction of current flow through their load terminals to approximately zero, one load terminal of the first control device being connectable to one terminal of said alternating current source, the other load terminal of said first control device being connectable through the load to the other terminal of said current source, one load terminal of said second control device being connectable to one terminal of the alternating source, a resistance device interconnecting the other load terminal of said second control device to the other terminal of the alternating source, means for providing a first trigger signal in response to the cyclic variation of said source, means for applying said first trigger signal at will to the control terminal of said second control device to render the same conductive, means coupling said other load terminal of said second control device to the control terminal of said first control device to provide a second trigger signal for rendering the first control device conductive in response to said second control device becoming non-conductive, whereby the source voltage is applied to the load at a point in time corresponding approximately to zero source voltage.

9. The control circuit of claim 8 comprising means for initially applying said first trigger signal to said second control device control terminal while preventing the voltage at said other load terminal of said second control device from triggering said first control device, whereby the second control device always becomes conductive before the first control device.

10. A control circuit for controlling the current flow through a load from an alternating current power source having two terminals, said circuit comprising first and second control devices each of which has two load terminals and a control terminal, each of said control devices being rendered conductive between its load terminals by a control signal applied to the control terminal and being rendered non-conductive by current flowing through the load terminals being reduced to approximately zero, one load terminal of each control device being connected to one terminal of said alternating current power source, the other load terminal of the first of said control devices being connected through the load to the other terminal of the power source, and an impedance having one side connected to said other terminal of said power source, the other load terminal of the second control device being connected to the other side of said impedance, and a pair of switch means which are sequentially rendered conductive by an energizing signal, the switch means which is first rendered conductive being connected between said other load terminal and the control terminal of the second control device, the other switch means being connected between the other load terminal of the second control device and the control terminal of the first control device.

11. The control circuit of claim 10 wherein said control devices comprise triacs, each of which includes two load terminals and one control terminal.

12. The control circuit of claim 11 wherein said pair of switch means comprise a pair of reed switches which are sequentially rendered conductive by an energizing signal.

13. The control circuit of claim 12 wherein said impedance comprises a resistor having one terminal connected to the other terminal of said power source and the other load terminal of the second triac being connected to the other terminal of said resistor.

14. A control circuit for controlling the current flow through a load from an alternating current source having two terminals, said circuit comprising a control device having two load terminals and a control terminal and having a characteristic such that it is rendered conductive between its load terminals by a control signal applied to the control terminal and rendered non-conductive by reduction of current flow to approximately zero through its load terminals, one load terminal of the control device being connectable to one terminal of said alternating current source, the other load terminal of said control device being connectable through the load to the other terminal of said source, circuit means including a transformer having its primary winding coupled across said alternating current source terminals for providing a voltage across its secondary winding which is in leading phase relation to the voltage of said alternating current source, a full-wave rectifier coupled to said secondary winding for providing a leading pulsating D.C. signal voltage, said full-wave rectifier having a pair of output terminals of opposite polarity, one of said output terminals being connected conductively to one of said alternating current source terminals, circuit means responsive to said signal voltage across the other of said output terminals and one alternating source terminal for providing trigger pulses at substantially the half-cycle points of the voltage of said alternating current source, and means for coupling said triggering pulses to the control terminal of said control device to thereby render it conductive and impress the source voltage across the load at approximately a zero voltage point thereof.

15. The control circuit of claim 14 comprising a switchable control means responsive to said leading voltage signal and said trigger pulses to provide a trigger voltage to the control terminal of said control device at said zero voltage points and during a substantial portion of each half-cycle of said source after each zero voltage point.

16. A control circuit for controlling the current flow through a load from an alternating current power source having two terminals, said circuit comprising first and second control devices each having two load terminals and a control terminal, each of said first and second control devices being rendered conductive between its load terminals by a control signal applied to the control terminal and being rendered non-conductive by current flowing through the load terminals being reduced to approximately zero, one load terminal of said first control device being connected to one terminal of said alternating current power source, the other load terminal of said first control device being connected through the load to the other terminal of said power source, one load terminal of the second control device being coupled to the control terminal of said first control device and the remaining load terminal of said second control device being connected to a source of varying potential the variations of which are determined by said power source, means responsive to cyclic variation in the power source for providing a turn-on signal at approximately the beginning of a half-cycle of said power source, means for coupling said turn-on signal to the control terminal of said second control device for rendering said second control device conductive, means responsive to the turn-on of said second control device for providing a triggering signal, and means for coupling said triggering signal to the control terminal of said first control device thereby rendering said first control device conductive so as to impress the source voltage across the load at a point in time corresponding approximately to zero source voltage, said coupling means including a third control device, one load terminal thereof being coupled to the control terminal of said first control device and the other load terminal thereof being coupled to a source of varying voltage, said varying voltage source providing an output determined by said power source and in the form of half-cycles thereof, said triggering signals being selectively coupled to the control terminal of said third control device, and said second and third control devices being in the form of silicon controlled rectifiers.

References Cited

UNITED STATES PATENTS

| | | |
|---|---|---|
| 3,319,152 | 5/1967 | Pinckaers. |
| 3,329,837 | 7/1967 | Hewie. |
| 3,335,291 | 8/1967 | Gutzwiller. |
| 3,402,302 | 9/1968 | Coburn _____ 307—133 |
| 3,417,320 | 12/1968 | Muskovac. |

LEE T. HIX, Primary Examiner

A. D. PELLINEN, Assistant Examiner

U.S. Cl. X.R.

317—11; 323—24, 38